Figure 1:
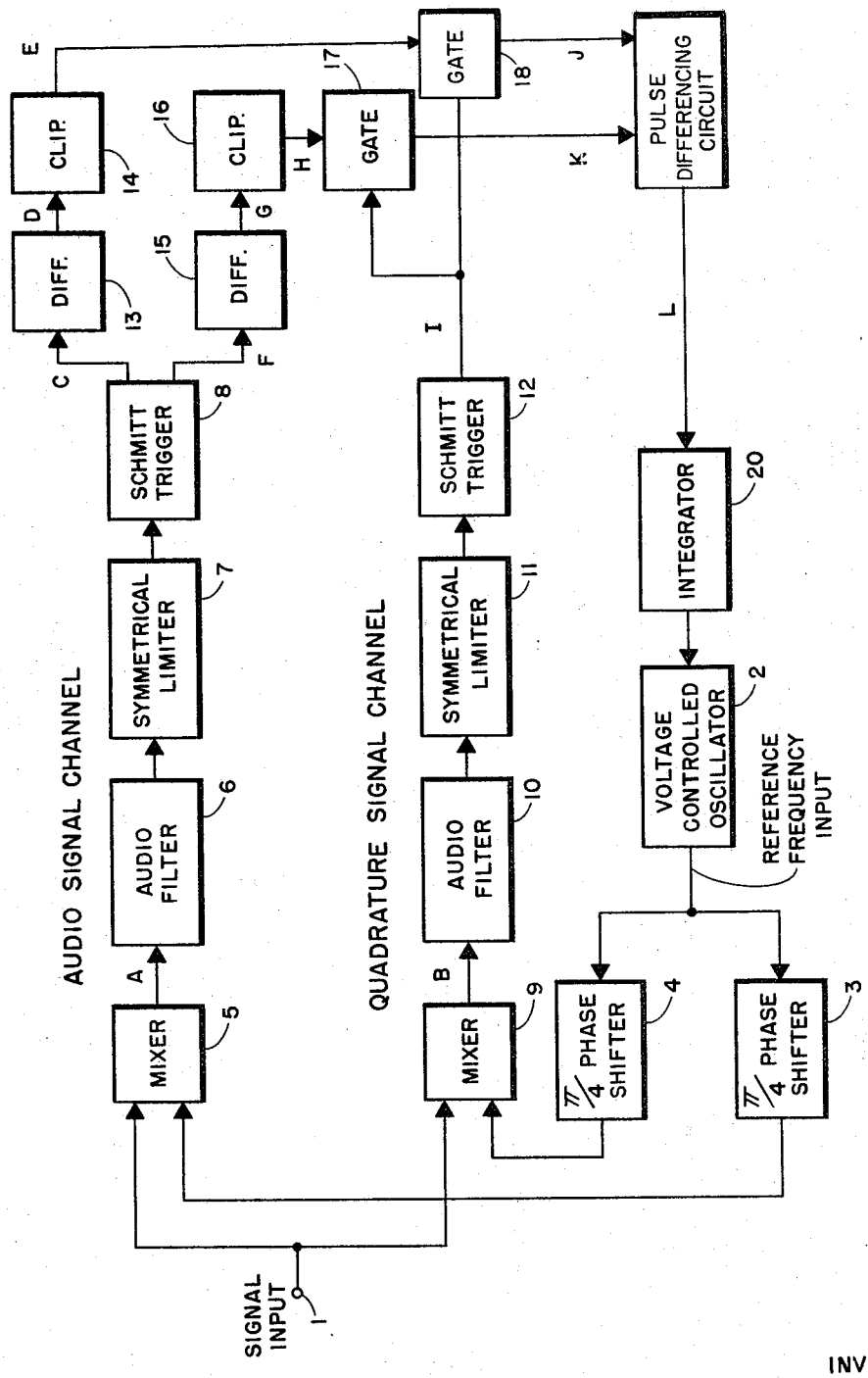

Dec. 27, 1966    V. KROSS    3,295,127
DOPPLER FREQUENCY TRACKER
Filed April 12, 1965    2 Sheets-Sheet 1

INVENTOR
VICTOR KROSS
BY
Robert S. Toperzer

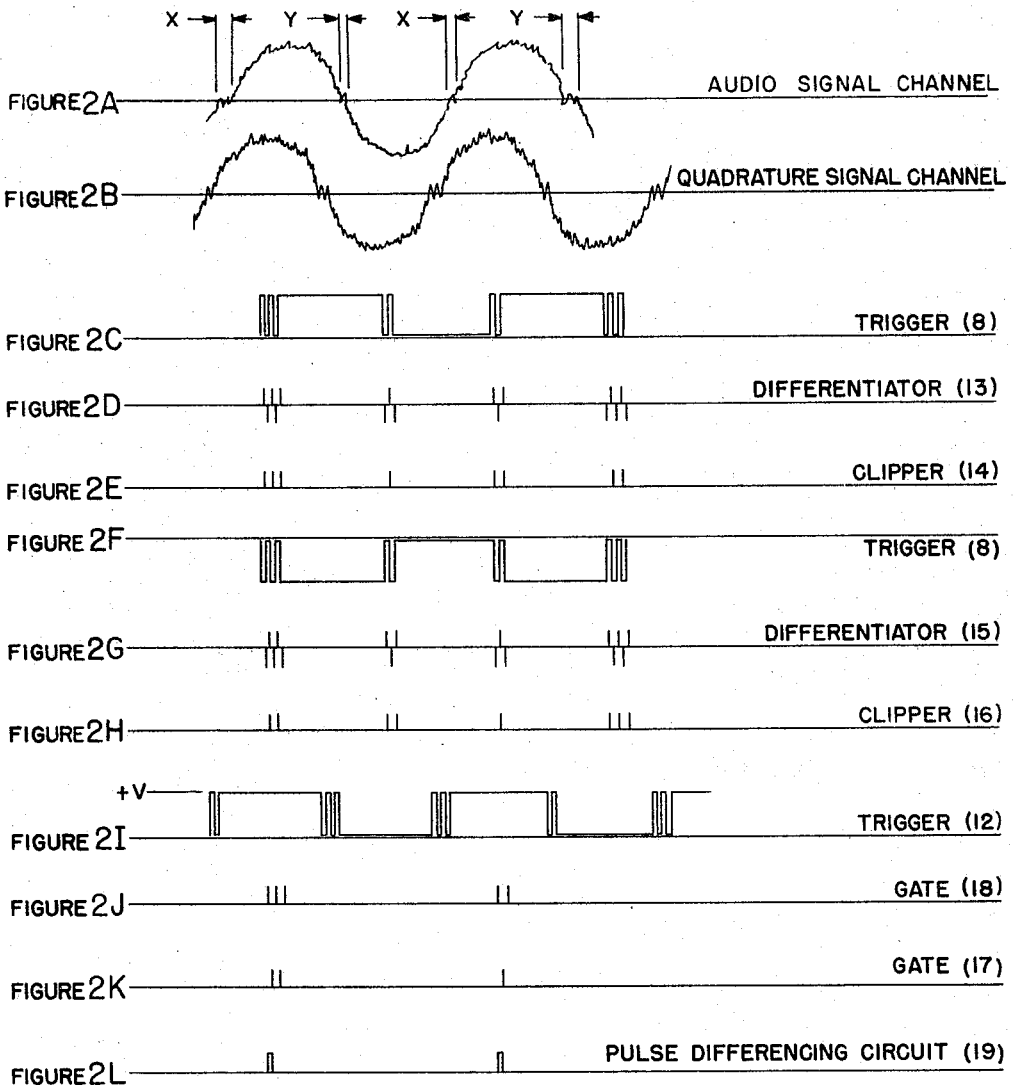

United States Patent Office 3,295,127
Patented Dec. 27, 1966

3,295,127
DOPPLER FREQUENCY TRACKER
Victor Kross, Framingham, Mass., assignor to Laboratory for Electronics, Inc., Boston, Mass., a corporation of Delaware
Filed Apr. 12, 1965, Ser. No. 447,225
9 Claims. (Cl. 343—7)

The present invention relates in general to radar systems and in particular to an apparatus for determining and tracking the frequency of the return signals in a Doppler radar system.

In one type of airborne Doppler radar system, three depressed pencil beams are transmitted from the aircraft, one forward, one rearward, and one to the side. Due to the motion of the aircraft relative to the ground, the return signals from each beam exhibit an apparent change in frequency, known as the Doppler frequency shift, with respect to the original transmitted signal. The magnitude and sense of this apparent frequency shift is detected and processed to provide an indication of the ground speed, drift angle and vertical velocity of the aircraft or other airborne object as the case may be. Although a single frequency signal is transmitted, due to the irregular nature of the reflecting terrain and the finite width of each beam, the returned signal consists of a broad band of frequencies. Thus, it is required to determine the Doppler frequency characteristic which the spectrum represents, and to accurately sense the magnitude and direction, however large or small, of any frequency deviation that is exhibited relative to a fixed reference.

One device that has been used for this purpose is a frequency discriminator incorporating tuned circuits. However, the frequency selectively of this kind of device leaves much to be desired and also it has a poor capture ratio, especially for narrow band operation. Still another drawback is frequency stability.

An axis-crossing counter, another device that is often used for this purpose, responds to individual zero axis crossings of the return signal waveform. However, a conventional axis crossing counter is unable to distinguish between the zero axis-crossings of the true signal evidencing the Doppler shift, and the zero axis-crossing of accompanying noise signals.

Broadly speaking in the present invention an input I.F. signal derived from the Doppler shifted return signal is applied simultaneously to two channels. A variable frequency oscillator generates a reference frequency which is mixed with the input signal in each channel to provide audio signals in each channel having a quadrature phase relation. In one channel, pulses representing the positive and negative axis-crossings of the audio signal waveform are applied to a pair of gates. Gating pulses to control the condition of the gates are derived from the quadrature signal waveform in the other channel and utilized to gate the pulses representing the positive and negative axis-crossings to a pulse differencing circuit. The pulse differencing circuit processes the gated pulses and provides an error signal indicative of the frequency difference between the reference signal and the input signal waveform, the sense of the error signal corresponding to the sense of the difference. An integrator applies the error signal to the variable frequency oscillator thereby automatically controlling the frequency of the reference signal in accordance with the frequency of the input signal.

It is a primary object of the present invention to provide a new and improved digital tracker.

A further object is the provision of a closed loop Doppler frequency tracker that utilizes digital rather than analog techniques in order to achieve greater accuracy.

A further object of the present invention is the provision of an automatic frequency tracker capable of reliable operation even when the signal to noise ratio is poor.

Another object is to provide a narrow band frequency tracker for utilization in a Doppler radar system.

A further object of the present invention is to provide a frequency tracker which is capable of operation over a relatively broad range of Doppler frequencies.

A further object is the provision of an apparatus that automatically controls the frequency of an oscillator in accordance with the frequency of the input signal.

Another object is the provision of a highly accurate and trouble free frequency tracker.

These and other objects and advantages will become apparent from the following detailed description when read in conjunction with the accompanying drawings in which:

FIG. 1 is a block diagram of a preferred embodiment in accordance with the principles of this invention, and FIGS. 2A–2L display various signal waveforms occurring at specific points in the tracker system illustrated in FIG. 1.

With reference now to the drawings and more particularly to FIG. 1 thereof, there are illustrated two parallel channels, a signal channel and a quadrature channel, having a common input terminal 1 on which is impressed an input signal waveform. In this instance the input signal waveform is assumed to be in the intermediate frequency range and contains the Doppler shift information of the received signal reflected from targets. Each channel includes an individual mixer 5 and 9, respectively, for heterodyning the input signal with a reference signal which is generated by an oscillator 2. The frequency of this reference signal is caused to approximate that of the input signal. Also, prior to being applied to the mixers 5 and 9 in each channel, the reference signal is passed through phase shifters 3 and 4 which split the reference signal into two identical signal components of the same frequency but displaced in phase by 90°. The two phase shifters 3 and 4 are arranged so that one phase shifter imparts a 45° phase shift in one direction while the other phase shifter imparts a 45° phase shift in the other direction. The actual method of deriving the phase quadrature audio signals is immaterial to the invention. For example, although two phase shifters have been shown for illustrative purposes, one could readily employ one 90° phase shifter. Thus, the signals in the two parallel channels resulting from the heterodyning process are in phase quadrature with each other and have a frequency in the audio range.

The audio output signal from mixer 5 is passed through an audio filter 6 which sharply limits the bandwidth of the audio signal. The narrow banded signal output of the filter is applied to symmetrical limiter 7 where it is converted into a somewhat rectangular waveform and that waveform in turn is impressed on the input of a Schmidt trigger 8. The quadrature channel is similar to the signal channel in that the input signal is heterodyned with the reference signal in mixer 9 and the audio signal output is narrow banded in an audio filter 10, shaped in a symmetrical limiter 11, and impressed on the input of a Schmidt trigger 12. However, the Schmidt trigger 12 in the quadrature channel provides a single square wave output in response to the applied audio signal while the Schmidt trigger 8 in the signal channel provides two identical outputs inverted in phase with respect to each other. The square wave output of Schmidt trigger 12 is simultaneously applied to the enabling inputs of gates 17 and 18.

The two square wave outputs of Schmidt trigger 8 are first differentiated, and then clipped in differentiating circuits 13, 15, respectively, and clipping circuits 14, 16, respectively. If desired, monostable multivibrators may be employed in place of the differentiator and clipper circuit pairs. The pulse output of clipper 14 is applied to the sense input of gate 18 while the pulse output of clipper 16 is impressed upon the sense input of gate 17. Output pulses from gates 17 and 18 are processed in a pulse differencing circuit 19 which produces an error signal at its output indicative of the magnitude and sense of the difference between the numbers of output pulses from gates 17 and 18. This error signal is integrated in integrating circuit 20 and impressed on oscillator 2 to correct the frequency of the reference signal when it has deviated from the frequency of the input signal.

The operation of the preferred embodiment shown in FIG. 1 will best be understood with reference to the signal waveforms of FIG. 2. FIG. 2A depicts a noisy signal whose frequency is to be determined. FIG. 2B shows the identical noisy signal shifted in phase so that it leads the signal of FIG. 2A by 90°. The signal waveform of FIG. 2A represents the output of mixer 5 while the signal shown in FIG. 2B represents the output of mixer 9. It is to be noted that the quadrature relationship of the two signals is a result of mixing the input signal with the two components of the reference signal which are themselves displaced in phase by 90°. The two outputs of Schmidt trigger 8 are shown by FIGS. 2C and 2F. The output of differentiating circuit 13 comprises a set of positive and negative pulses depicted by FIG. 2D. When these pulses are applied to clipper circuit 14, the negative pulses are eliminated and the result is a plurality of positive pulses as shown by FIG. 2E. The inverted phase output of Schmidt trigger 8 is shown by FIG. 2F and similarly when this output is applied to differentiating circuit 15, it produces a plurality of both positive and negative pulses as shown by FIG. 2G. These in turn are impressed on clipper circuit 16 which result in a set of positive pulses shown by FIG. 2H. The positive pulses of FIG. 2E represent the positive slope axis crossings of the input signal while the positive pulses of FIG. 2H represent the negative slope axis crossings of the input signal. Since the two outputs of the Schmidt trigger 8 are 180° out of phase with each other, the same polarity pulses can represent both the positive and negative slope axis crossings of the input signal waveform. It is significant also that the pulses shown by FIGS. 2E and 2H occur at different times.

FIG. 2I represents the output of Schmidt trigger 12 and has a maximum amplitude of +V volts. This signal output is applied to both gates 17 and 18. Gates 17 and 18 are arranged to be enabled only when the input signal from Schmidt trigger 12 has an amplitude of +V volts. Since the signal waveforms in the input channel and the quadrature channel are in phase quadrature and the gates 17 and 18 are enabled only when a +V input is applied from Schmidt trigger 12, only pulses occurring in alternate time axis-crossings of the true audio signal waveform are passed to pulse differencing circuit 19. This is clearly shown by a comparison of FIGS. 2A, 2E, 2H, and 2I. Signal waveform 2I attains a +V amplitude only during the occurrence of pulses representing the positive and negative axis crossings derived from time period X of the input signal waveform depicted in FIG. 2A. The pulses derived from the axis crossings during time interval Y, as shown in FIG. 2A, are blocked by gates 17 and 18. The pulse outputs shown in FIGS. 2J and 2K are the gated outputs of gates 18 and 17 respectively. These pulse outputs are applied to pulse differencing circuit 19 over two separate lines. The pulse differencing circuit in effect subtracts the pulses occurring on one input line from the pulses applied over the second input line. A suitable pulse differencing circuit is shown and described in U.S. Patent No. 3,094,666. Since there occurs more pulses representing positive slope axis crossings than pulses representing negative slope axis crossings during the time interval X, as shown by a comparison of signals 2J and 2K, a net result of one positive pulse during the time period X, as shown in FIG. 2L, occurs on the output line of the pulse differencing circuit 19. This output represents the frequency of the true input signal even in the presence of noise, and its sense indicates whether the input signal frequency is above or below the reference frequency. The output of pulse differencing circuit is positive indicating the input signal frequency is greater than the reference frequency. Integration of the pulse difference signal produces an analog voltage signal and this is the signal which is used to control the frequency of oscillator 20.

As previously described, the leading or lagging relation between the input signal and the quadrature signal determines whether the frequency of the input signal is above or below the reference frequency. The preceding description was predicated upon the quadrature signal leading the input signal. If the quadrature signal lags the input signal, the pulse differencing circuit produces a negative error signal which causes the frequency of oscillator 2 to decrease correspondingly.

Numerous modifications and departures from the specific apparatus described herein may be made by those skilled in the art without departing from the inventive concept of the invention. Accordingly, the invention is to be construed as limited only by the spirit and scope of the appended claims.

What is claimed is:
1. An input signal frequency tracker comprising,
(a) means for generating a reference signal,
(b) means for mixing the input signal with a reference signal to produce a first audio signal,
(c) means for mixing the input signal with the reference signal to derive a second audio signal shifted in phase with respect to the first audio signal,
(d) means for deriving pulses representing the axis crossings of the first audio signal,
(e) means responsive to the phase shifted signal to selectively transmit only those pulses indicative of the true first audio signal frequency,
(f) and means to couple to the selectively transmitted pulses to the reference signal generating means for varying the frequency of the reference signal.

2. A Doppler input signal frequency tracker comprising:
(a) means for generating a reference signal,
(b) means for mixing the input signal with the reference signal to derive a first audio signal,
(c) means for mixing the input signal with the reference signal to derive a second audio signal shifted in phase with respect to the first audio signal,
(d) means for deriving pulses representing the positive and negative axis crossing points of the first audio signal,
(e) a first gate to receive pulses representing the positive slope axis crossings of the first audio signal,
(f) a second gate to receive pulses representing the negative slope axis crossings of the first audio signal,
(g) means for obtaining gating signals from the phase shifted signal,
(h) said first and second gates being enabled by the gating signals to pass the applied pulses,
(i) means responsive to the passed pulses to generate an error signal indicative of the frequency difference between the reference signal and the input signal,
(j) and means to couple the error signal to said reference signal generating means for varying the frequency of the reference signal.

3. An input signal frequency tracker as in claim 2 wherein the first audio signal is in phase quadrature with the second audio signal.

4. An input signal frequency tracker in accordance with claim 2 wherein the said means for generating an error signal is a pulse differencing circuit.

5. An input signal frequency tracker as in claim 2 wherein the said means for generating a reference signal is a voltage controlled oscillator.

6. An input signal frequency tracker as in claim 5 wherein said means to couple the error signal includes an integrator for applying the said error signal to the voltage controlled oscillator.

7. An input signal frequency tracker as in claim 6 wherein the said means for obtaining gating signals is a Schmidt trigger circuit.

8. A frequency tracker apparatus as in claim 2 and further comprising a filter for narrow banding the first audio signal.

9. An input signal frequency tracker comprising:
 (a) a voltage controlled oscillator for producing a reference signal, means responsive to the reference signal for deriving first and second reference signals identical in frequency but shifted in phase with respect to each other,
 (b) first and second channels, each channel including a mixer, a filter, a symmetrical limiter and a Schmidt trigger connected in series,
 (c) means for applying the input signal simultaneously to the mixers in both channels,
 (d) means applying the first reference signal to the mixer in the first channel,
 (e) means applying the second reference signal to the mixer in the second channel, first and second gates,
 (f) circuit means including differentiating means responsive to the output of the Schmidt trigger in the first channel for applying pulses representing positive axis crossings to said first gate and pulses representing negative axis crossings to said second gate,
 (g) a pulse differencing circuit, each of said first and second gates having an individual output connected to a separate input of said pulse differencing circuit,
 (h) means connecting the output of the Schmidt trigger in the second channel to the first and second gates whereby those gates are simultaneously enabled or inhibited,
 (i) said pulse differencing circuit being responsive to pulses passed by the first and second gates to produce an error signal indicative of the frequency difference between the input signal and the reference signal,
 (j) and an integrator for applying the error signal to the voltage controlled oscillator whereby the frequency of the reference signal is varied to equal the frequency of the input signal.

No references cited.

CHESTER L. JUSTUS, *Primary Examiner.*

T. H. TUBBESING, *Assistant Examiner.*